(12) United States Patent
Nakajima et al.

(10) Patent No.: US 10,780,737 B2
(45) Date of Patent: Sep. 22, 2020

(54) BICYCLE HUB

(71) Applicant: Shimano Inc., Sakai, Osaka (JP)

(72) Inventors: Jun Nakajima, Osaka (JP); Kenkichi Inoue, Osaka (JP)

(73) Assignee: Shimano Inc., Osaka (JP)

( * ) Notice: Subject to any disclaimer, the term of this patent is extended or adjusted under 35 U.S.C. 154(b) by 351 days.

(21) Appl. No.: 15/869,783

(22) Filed: Jan. 12, 2018

(65) Prior Publication Data

US 2019/0217662 A1 Jul. 18, 2019

(51) Int. Cl.
*B60B 27/04* (2006.01)
*F16D 11/14* (2006.01)
*B60B 27/02* (2006.01)

(52) U.S. Cl.
CPC .......... *B60B 27/047* (2013.01); *B60B 27/023* (2013.01); *F16D 11/14* (2013.01); *B60Y 2200/13* (2013.01)

(58) Field of Classification Search
CPC ..... B60B 27/023; B60B 27/047; F16D 11/14; F16D 41/32
See application file for complete search history.

(56) References Cited

U.S. PATENT DOCUMENTS

| | | | | |
|---|---|---|---|---|
| 4,593,799 A * | 6/1986 | Ozaki | ................... | F16D 41/36 192/46 |
| 5,964,332 A | 10/1999 | King | | |
| 9,199,509 B2 | 12/2015 | Koshiyama | | |
| 2008/0006500 A1* | 1/2008 | Spahr | ................. | B60B 27/0073 192/64 |
| 2012/0032498 A1* | 2/2012 | Klieber | ................. | B60B 27/047 301/55 |
| 2015/0202919 A1* | 7/2015 | Koshiyama | ........... | B60B 27/023 192/64 |
| 2016/0223033 A1* | 8/2016 | Fujita | ................. | B60B 27/0026 |
| 2017/0096029 A1* | 4/2017 | Fujita | ................. | B60B 27/0026 |
| 2018/0345723 A1* | 12/2018 | Fujita | ................. | B60B 27/0026 |

FOREIGN PATENT DOCUMENTS

| | | |
|---|---|---|
| DE | 10 2016 101 498 A1 | 8/2016 |
| DE | 10 2016 010 853 A1 | 4/2017 |
| FR | 1038012 A | 9/1953 |
| GB | 584472 A | 1/1947 |

* cited by examiner

*Primary Examiner* — Kip T Kotter
(74) *Attorney, Agent, or Firm* — Global IP Counselors, LLP

(57) ABSTRACT

A bicycle hub has a hub axle, a hub shell, a sprocket support body, first and second ratchet members and a friction member. The hub shell and the sprocket support body are mounted on the hub axle. The first ratchet member has at least one first ratchet tooth and rotates with the sprocket support body. The second ratchet member has at least one second ratchet tooth mating with the first ratchet tooth and rotates with the hub shell. The friction member is configured to rotate with one of the hub shell and the first ratchet member and contacts a contacted member configured to rotate with the other of the hub shell and the first ratchet member. The sprocket support body has a guiding portion that move the first ratchet member and the second ratchet member from each other while coasting.

22 Claims, 9 Drawing Sheets

BICYCLE HUB

BACKGROUND

Field of the Invention

This invention generally relates to a bicycle hub. More specifically, the present invention relates to a bicycle hub that is quieter during coasting as compared to a conventional bicycle hub.

Background Information

Generally, bicycle wheels have a hub, a plurality of spokes and an annular rim. The hub has a hub axle that is non-rotatably mounted to a frame of the bicycle. The hub has a hub shell that is coaxially coupled to the hub axle so that the hub shell is disposed radially outwardly with respect to the hub axle. The bearings are configured and arranged to support the hub shell so that the hub shell can freely rotate around the hub axle. In some bicycles having multiple speeds, a wheel of the bicycle, typically the rear wheel, is provided with a bicycle freewheel that is arranged on a hub of the wheel. The bicycle freewheel usually has a one-way clutch function whereby it only transfers torque in one direction. Thus, freewheels are used so that the bicycle can advance freely without any rotation of the pedals (i.e., during coasting). During coasting, the bicycle freewheel is considered to be in a state of freewheeling in which the bicycle wheel can freely rotate while the sprockets remain stationary.

SUMMARY

Generally, the present disclosure is directed to various features of a bicycle hub. In one feature, a bicycle hub is provided in which ratchet noise can be reduced during coasting with respect to a conventional bicycle hub having a conventional bicycle freewheel.

One aspect is to provide a bicycle hub having a hub axle, a hub shell, a sprocket support body, a first ratchet member, a second ratchet member and a friction member. The hub axle defines a rotational axis. The hub shell is rotatably mounted on the hub axle to rotate around the rotational axis. The sprocket support body is rotatably mounted on the hub axle to rotate around the rotational axis. The first ratchet member has at least one first ratchet tooth and is configured to rotate with the sprocket support body. The second ratchet member has at least one second ratchet tooth mating with the at least one first ratchet tooth. The second ratchet member is configured to rotate with the hub shell. The friction member is configured to rotate with one of the hub shell and the first ratchet member. The friction member contacts in a radial direction of the rotational axis a contacted member that is configured to rotate with the other of the hub shell and the first ratchet member. The friction member has an annular shape. The sprocket support body has an outer peripheral surface having a guiding portion configured to move relatively the first ratchet member and the second ratchet member from each other in an axial direction of the rotational axis while coasting.

With the bicycle hub according to the first aspect, it is possible to reduce noise caused by ratcheting between the first and second ratchet members during bicycle freewheeling or coasting by increasing a sliding resistance of the first ratchet member.

A second aspect is to provide a bicycle hub having a hub axle, a hub shell, a sprocket support body, a first ratchet member, a second ratchet member and a friction member. The hub axle defines a rotational axis. The hub shell is rotatably mounted on the hub axle to rotate around the rotational axis. The sprocket support body is rotatably mounted on the hub axle to rotate around the rotational axis. The sprocket support body has an outer peripheral surface. The first ratchet member has at least one first ratchet tooth and is configured to rotate with the sprocket support body. The second ratchet member has at least one second ratchet tooth mating with the at least one first ratchet tooth. The second ratchet member is configured to rotate with the hub shell. The friction member is configured to rotate with one of the hub shell and the first ratchet member. The friction member contacts in a radial direction of the rotational axis a contacted member that is configured to rotate with the other of the hub shell and the first ratchet member. The friction member includes at least a non-metallic material. The outer peripheral surface of the sprocket support body has a guiding portion configured to move relatively the first ratchet member and the second ratchet member from each other in an axial direction of the rotational axis while coasting.

With the bicycle hub according to the second aspect, it is possible to reduce noise caused by ratcheting between the first and second ratchet members during bicycle freewheeling or coasting by increasing a sliding resistance of the first ratchet member.

A third aspect is to provide a bicycle hub having a hub axle, a hub shell, a sprocket support body, a first ratchet member, a second ratchet member, a friction member and a biasing member. The hub axle defines a rotational axis. The hub shell is rotatably mounted on the hub axle to rotate around the rotational axis. The sprocket support body is rotatably mounted on the hub axle to rotate around the rotational axis. The sprocket support body has an outer peripheral surface. The first ratchet member has at least one first ratchet tooth and is configured to rotate with the sprocket support body. The second ratchet member has at least one second ratchet tooth mating with the at least one first ratchet tooth. The second ratchet member is configured to rotate with the hub shell. The friction member is configured to rotate with one of the hub shell and the first ratchet member. The friction member contacts in a radial direction of the rotational axis a contacted member that is configured to rotate with the other of the hub shell and the first ratchet member. The biasing member is disposed between the hub shell and the first ratchet member. The biasing member biases the first ratchet member in an axial direction of the rotational axis. The outer peripheral surface of the sprocket support body has a guiding portion configured to move relatively the first ratchet member and the second ratchet member from each other in an axial direction of the rotational axis while coasting.

With the bicycle hub according to the third aspect, it is possible to reduce noise caused by ratcheting between the first and second ratchet members during bicycle freewheeling or coasting by increasing a sliding resistance of the first ratchet member.

A fourth aspect is to provide a bicycle hub having a hub axle, a hub shell, a sprocket support body, a first ratchet member, a second ratchet member and a friction member. The hub axle defines a rotational axis. The hub shell is rotatably mounted on the hub axle to rotate around the rotational axis. The sprocket support body is rotatably mounted on the hub axle to rotate around the rotational axis.

The sprocket support body has an outer peripheral surface. The first ratchet member has at least one first ratchet tooth and is configured to rotate with the sprocket support body. The second ratchet member has at least one second ratchet tooth mating with the at least one first ratchet tooth. The second ratchet member is configured to rotate with the hub shell. The friction member contacts the first ratchet member in a radial direction of the rotational axis. The outer peripheral surface of the sprocket support body has a guiding portion configured to move relatively the first ratchet member and the second ratchet member from each other in an axial direction of the rotational axis while coasting.

With the bicycle hub according to the fourth aspect, it is possible to reduce noise caused by ratcheting between the first and second ratchet members during bicycle freewheeling or coasting by increasing a sliding resistance of the first ratchet member.

A fifth aspect is to provide a bicycle hub having a hub axle, a hub shell, a sprocket support body, a first ratchet member, a second ratchet member and a friction member and an additional friction member. The hub axle defines a rotational axis. The hub shell is rotatably mounted on the hub axle to rotate around the rotational axis. The sprocket support body is rotatably mounted on the hub axle to rotate around the rotational axis. The sprocket support body has an outer peripheral surface. The first ratchet member has at least one first ratchet tooth and is configured to rotate with the sprocket support body. The second ratchet member has at least one second ratchet tooth mating with the at least one first ratchet tooth. The second ratchet member is configured to rotate with the hub shell. The friction member is configured to rotate with one of the hub shell and the first ratchet member. The friction member contacts in a radial direction of the rotational axis a contacted member that is configured to rotate with the other of the hub shell and the first ratchet member. The additional friction member is configured to rotate with one of the hub shell and the first ratchet member. The additional friction member contacts an additional friction surface provided on an additional contacted member. The additional contacted member is configured to rotate with the other of the hub shell and the first ratchet member. The additional friction surface is different from the friction surface. The outer peripheral surface of the sprocket support body has a guiding portion configured to move relatively the first ratchet member and the second ratchet member from each other in an axial direction of the rotational axis while coasting.

With the bicycle hub according to the fifth aspect, it is possible to reduce noise caused by ratcheting between the first and second ratchet members during bicycle freewheeling or coasting by increasing a sliding resistance of the first ratchet member.

In accordance with a sixth aspect of the present invention, the bicycle hub according to any of the first to fifth aspects is configured so that the guiding portion extends in at least a circumferential direction with respect to the sprocket support body.

With the bicycle hub according to the sixth aspect, it is possible to better guide the first ratcheting member to disengage from the second ratcheting member during bicycle coasting or freewheeling.

In accordance with a seventh aspect of the present invention, the bicycle hub according to the sixth aspect is configured so that the guide portion includes a flat surface formed perpendicular to an axial direction of the rotational axis.

With the bicycle hub according to the seventh aspect, it is possible to better disengage the first ratcheting member from the second ratcheting member during bicycle coasting or freewheeling.

In accordance with an eighth aspect of the present invention, the bicycle hub according to the seventh aspect is configured so that the guide portion includes a slanted surface with respect to the axial direction of the rotational axis.

With the bicycle hub according to the eighth aspect, it is possible to further minimize the noise during bicycle coasting or freewheeling.

In accordance with a ninth aspect of the present invention, the bicycle hub according to any of the first to eighth aspects is configured so that the guiding portion guides the first ratchet member toward the hub shell while coasting.

With the bicycle hub according to the ninth aspect, it is possible to better guide the first ratcheting member to disengage from the second ratcheting member during bicycle coasting or freewheeling.

In accordance with a tenth aspect of the present invention, the bicycle hub according to any of the first to ninth aspects is configured so that the at least one first ratchet tooth is disposed on an axial facing surface of the first ratchet member. The at least one second ratchet tooth is disposed on an axial facing surface of the second ratchet member that faces the axial facing surface of the first ratchet member.

With the bicycle hub according to the tenth aspect, it is possible to provide firm engagement between the first and second ratchet members during driving of the hub shell.

In accordance with an eleventh aspect of the present invention, the bicycle hub according to any of the first to tenth aspects is configured so that the outer peripheral surface of the sprocket support body has a first helical spline. The first ratchet member has a second helical spline mating with the first helical spline. The first ratchet member is movably mounted in an axial direction with respect to the sprocket support body via the second helical spline in engagement with the first helical spline while driving by a thrust force that is applied from the sprocket support body.

With the bicycle hub according to the eleventh aspect, it is possible to provide better engagement between the first and second ratchet members.

In accordance with a twelfth aspect of the present invention, the bicycle hub according to the eleventh aspect is configured so that the sprocket support body includes a plurality of the first helical spline on the outer peripheral surface. The first ratchet member includes a plurality of the second helical splines in mating engagement with the first helical splines of the sprocket support body.

With the bicycle hub according to the twelfth aspect, it is possible to provide better engagement between the first and second ratchet members.

In accordance with a thirteenth aspect of the present invention, the bicycle hub according to any of the first to twelfth aspects is configured so that the first and second ratchet members are annular members.

With the bicycle hub according to the thirteenth aspect, it is possible to provide better engagement between the first and second ratchet members.

In accordance with a fourteenth aspect of the present invention, the bicycle hub according to any of the first to thirteenth aspects is configured so that the second ratchet has a hub shell engagement portion that engages the hub shell. One of the hub shell engagement portion and the hub shell includes at least one protrusion extending radially and the other of the hub shell engagement portion. The hub shell includes at least one recess that is engaged with the at least one protrusion.

With the bicycle hub according to the fourteenth aspect, it is possible to provide good engagement between the second ratchet member and the hub shell.

In accordance with a fifteenth aspect of the present invention, the bicycle hub according to any of the first to fourteenth aspects further comprises a biasing member disposed between the hub shell and the first ratchet member. The biasing member biases the first ratchet member in the axial direction toward the second ratchet member.

With the bicycle hub according to the fifteenth aspect, it is possible to maintain the first and second ratchet members in engagement during driving and disengagement of the first and second ratchet members during coasting.

In accordance with a sixteenth aspect of the present invention, the bicycle hub according to the fifteenth aspect is configured so that the biasing member is configured to rotate with the hub shell. The first ratchet member contacts the guiding portion and disengages from the second ratchet member by a thrust force caused by frictional torque between the biasing member and the first ratchet member while coasting.

With the bicycle hub according to the sixteenth aspect, it is possible to better maintain the first and second ratchet members in a disengaged state.

In accordance with a seventeenth aspect of the present invention, the bicycle hub according to any of the first and sixteenth aspects is configured so that at least one bearing assembly rotatably supports the sprocket support body on the hub axle.

With the bicycle hub according to the seventeenth aspect, it is possible for the sprocket support body to rotate about the hub axle.

In accordance with an eighteenth aspect of the present invention, the bicycle hub according to any of the first to seventeenth aspects is configured so that at least one bearing assembly rotatably supporting the hub shell on the hub axle.

With the bicycle hub according to the eighteenth aspect, it is possible for the sprocket support body to rotate about the hub axle.

In accordance with a nineteenth aspect of the present invention, the bicycle hub according to any of the first to eighteenth aspects is configured so that the at least one first ratchet tooth includes a plurality of first ratchet teeth. The at least one second ratchet tooth includes a plurality of second ratchet teeth.

With the bicycle hub according to the nineteenth aspect, it is possible to provide better engagement between the first and second ratchet members.

In accordance with a twentieth aspect of the present invention, the bicycle hub according to any of the first to nineteenth aspects is configured so that the sprocket support body includes an abutment that abuts the second ratchet member to restrict axial movement of the second ratchet member away from the hub shell. The first ratchet member is disposed on an axial side of the second ratchet member that is opposite to the abutment of the sprocket support body.

With the bicycle hub according to the twentieth aspect, it is possible to easily position the second ratchet member to maintain engagement with the hub shell.

In accordance with a twenty-first aspect of the present invention, the bicycle hub according to any of the first to twentieth aspects is configured so that the hub shell includes an internal space. The outer peripheral surface of the sprocket support body supports the first and second ratchet members. The first and second ratchet members are at least partially disposed in the internal space of the hub shell.

With the bicycle hub according to the twenty-first aspect, it is possible for make the bicycle hub relatively axially compact to fit in a standard frame.

In accordance with a twenty-second aspect of the present invention, the bicycle hub according to any of the first to twenty-first aspects is configured so that the friction member includes at least a resin material that contacts the first ratchet member in the radial direction of the rotational axis.

With the bicycle hub according to the twenty-second aspect, it is possible to ensure good frictional resistance between the friction member and the first ratchet member during relative sliding between the friction member and the first ratchet member.

Also, other objects, features, aspects and advantages of the disclosed bicycle hub will become apparent to those skilled in the art from the following detailed description, which, taken in conjunction with the annexed drawings, discloses preferred embodiments of the bicycle hub.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
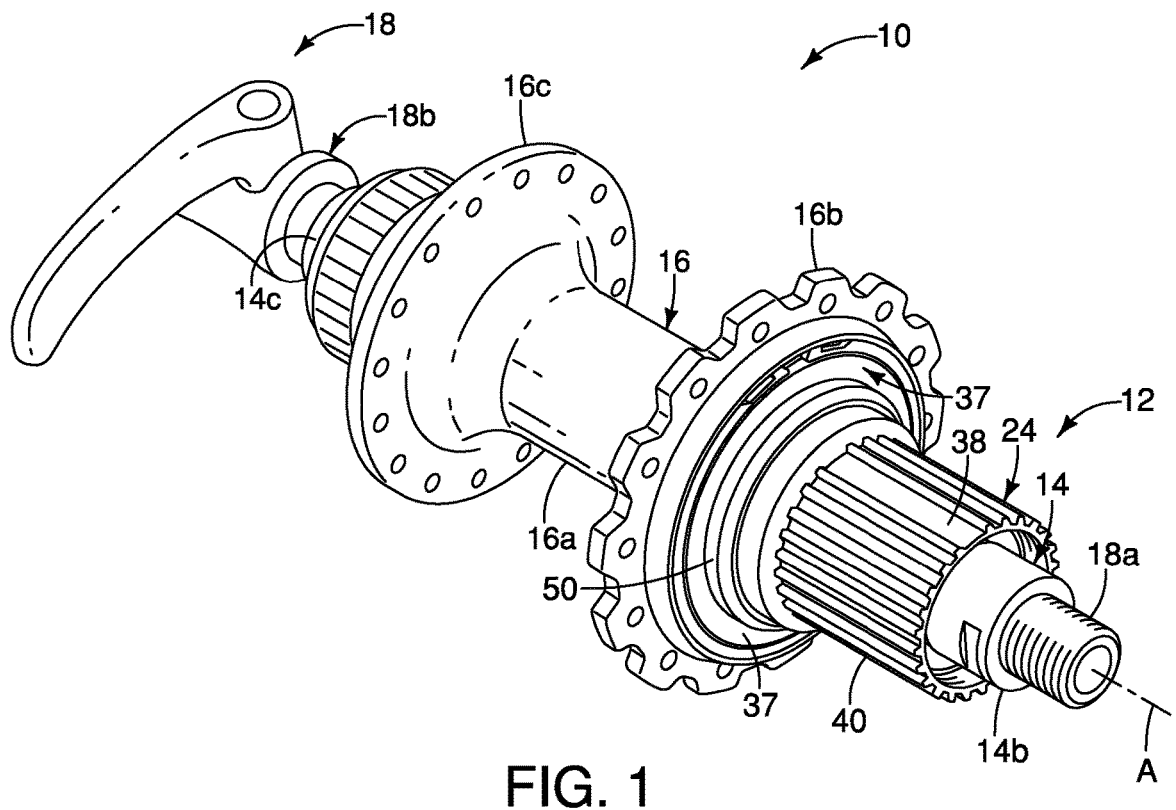
FIG. 1 is a perspective view of a rear bicycle hub in accordance with a first embodiment.

Referring initially to FIG. 1, a rear bicycle hub 10 is illustrated that is equipped with a bicycle freewheel 12 in accordance with a first illustrated embodiment. As shown in FIG. 1, the bicycle hub 10 basically comprises a hub axle 14 and a hub shell 16. Here, the hub axle 14 is a conventional member having a shaft portion 14a with a first end cap 14b screwed on a first threaded end of the hub axle 14 and a second end cap 14c screwed on a second threaded end of the hub axle 14. The hub axle 14 defines a rotational axis A. The hub shell 16 is rotatably mounted on the hub axle 14 to rotate around the rotational axis A. The hub shell 16 has a center tubular body 16a and a pair of spoke attachment flanges 16b and 16c extending outwardly in a radial direction from the center tubular body 16a.

Figure 2:
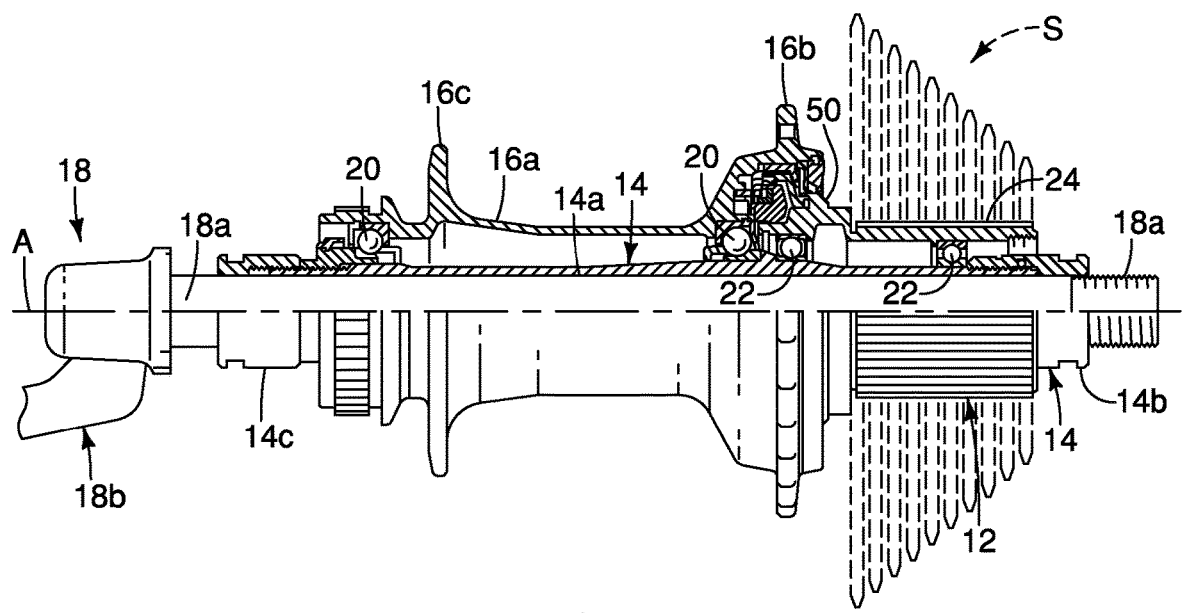
FIG. 2 is a half cross sectional view of the rear bicycle hub illustrated in FIG. 1.
Figure 3:
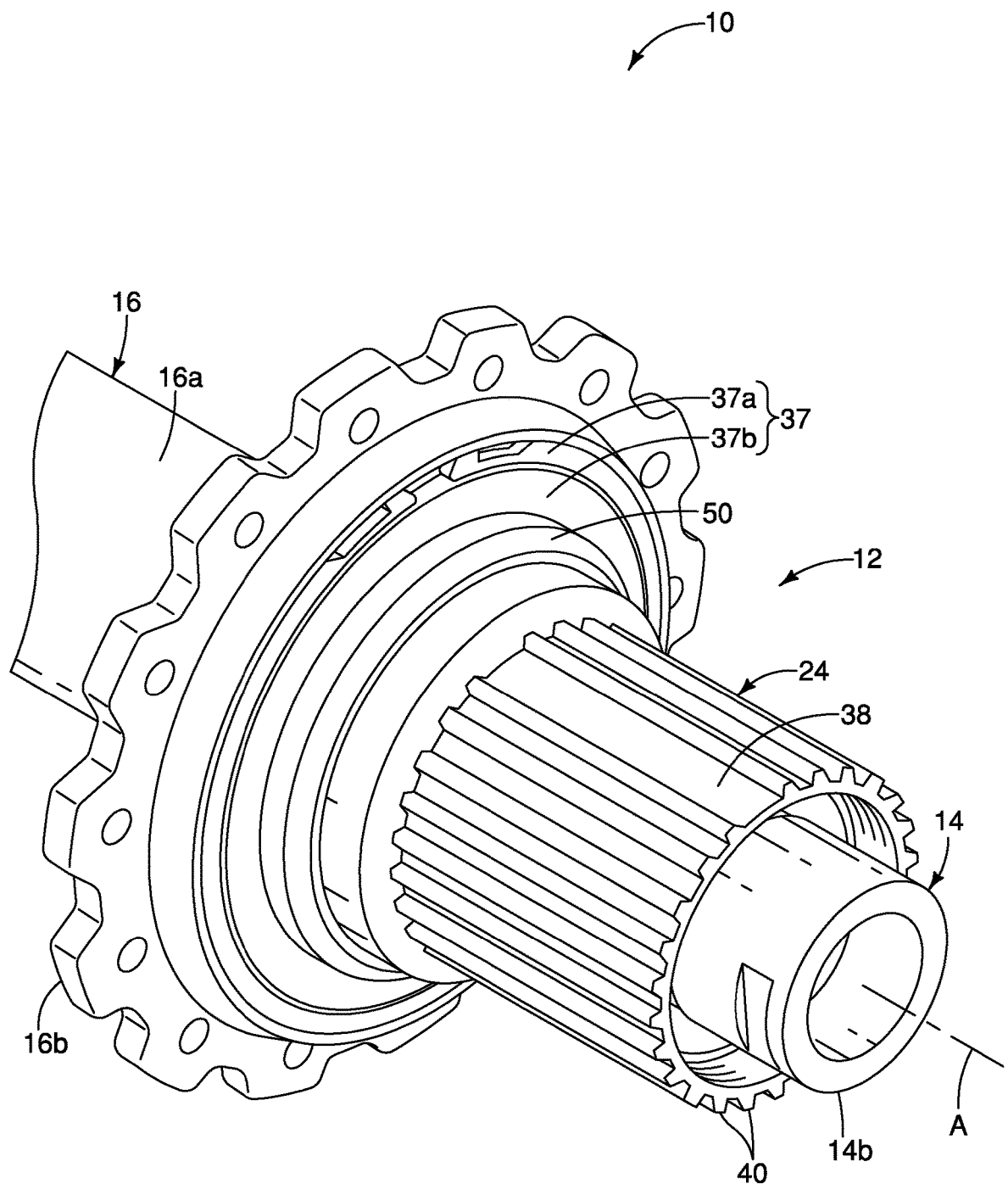
FIG. 3 is an enlarged perspective view of an end portion of the bicycle hub having a bicycle freewheel illustrated in FIGS. 1 and 2.
Figure 4:
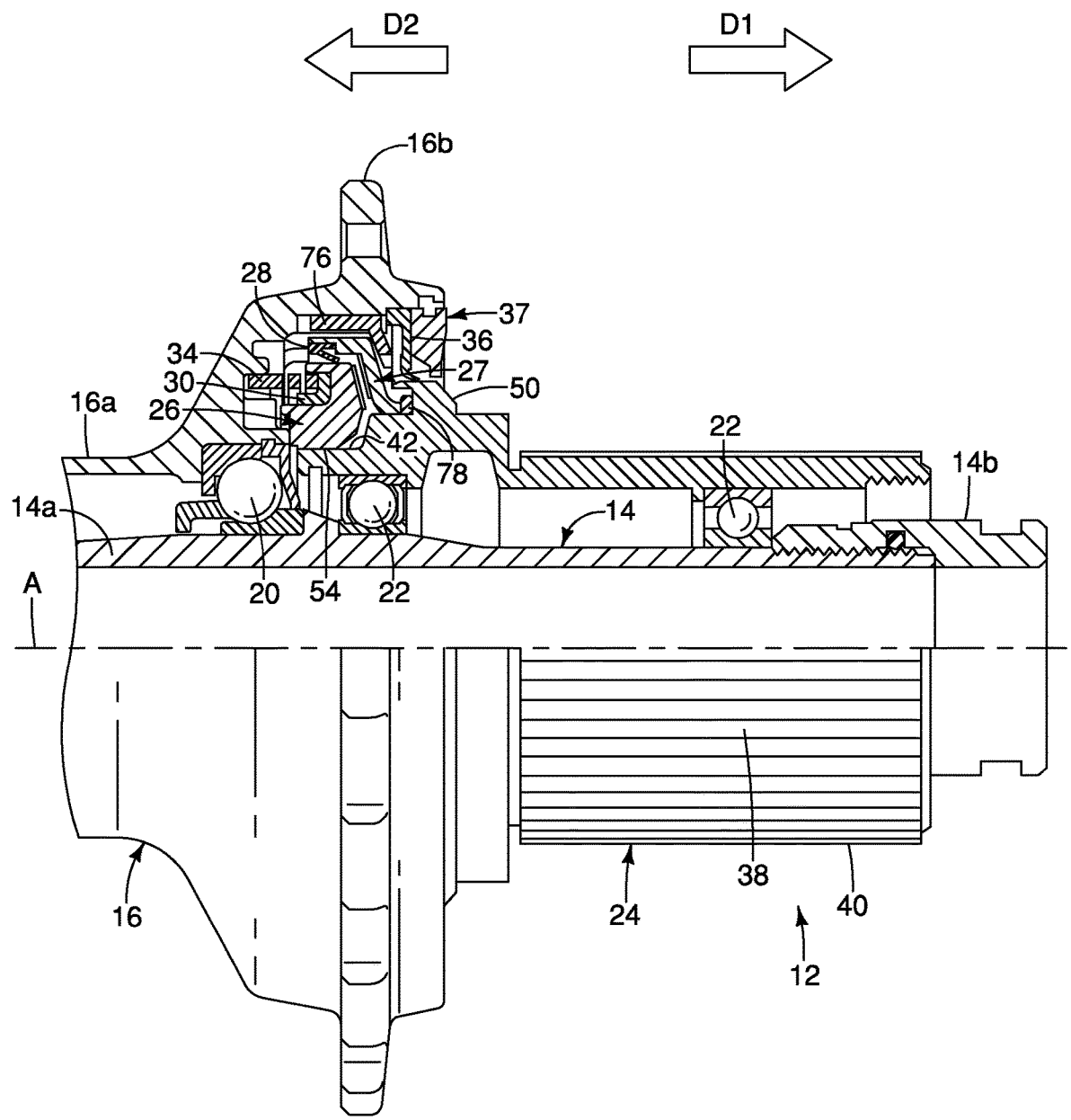
FIG. 4 is an enlarged half cross sectional view of the end portion of the rear bicycle hub illustrated in FIG. 3.

As shown in FIGS. 1 and 2, a frame securing device 18 is provided for attaching the bicycle hub 10 to a bicycle frame (not shown) in a conventional manner. In the first illustrated embodiment, the frame securing device 18 includes a skewer or spindle 18a that has a cam lever mechanism 18b mounted at one end of the spindle 18a. Thus, the bicycle hub 10 can be mounted onto a rear section of a bicycle frame of a bicycle (not shown).

As shown in FIG. 2, the bicycle hub 10 further comprises at least one bearing assembly for rotatably supporting the hub shell 16 on the hub axle 14. In the illustrated embodiment, the hub shell 16 is rotatably mounted on the hub axle 14 by a pair of bearing assemblies 20. The bearing assemblies 20 are conventional parts that are well known in the bicycle field, and thus, the bearing assemblies 20 will not be discussed any or illustrated in detail herein. Also, other bearing arrangements can be used as needed and/or desired.

Referring now to FIGS. 3 to 10, the bicycle hub 10 further comprises at least one bearing assembly 22, a sprocket support body 24, a first ratchet member 26 and a second ratchet member 27. The at least one bearing assembly 22 rotatably supports the sprocket support body 24 on the hub axle 14. In the first illustrated embodiment, the sprocket support body 24 is rotatably mounted on the hub axle 14 by a pair of the bearing assemblies 22. The sprocket support body 24 and the first and second ratchet members 26 and 27 form the bicycle freewheel 12. The bicycle freewheel 12 is configured to receive a plurality of sprockets S in a conventional manner.

Figure 5:
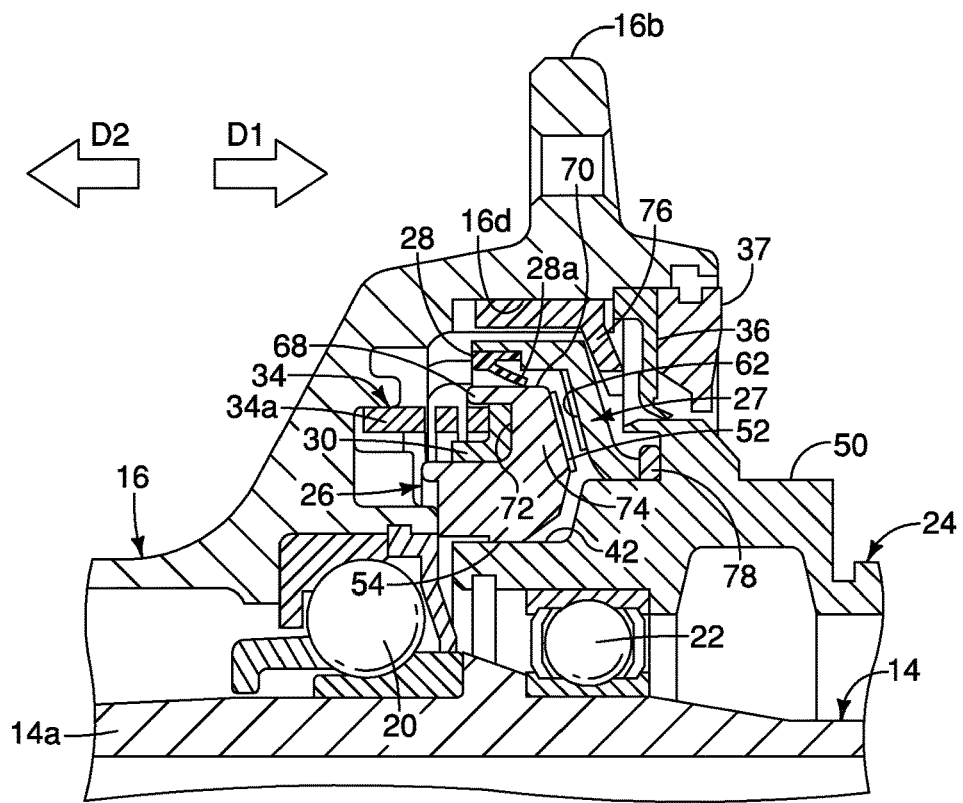
FIG. 5 is an enlarged half cross sectional view of a portion of the bicycle hub illustrated in FIG. 4 showing the first and second ratchet members in a disengaged position for coasting.
Figure 6:
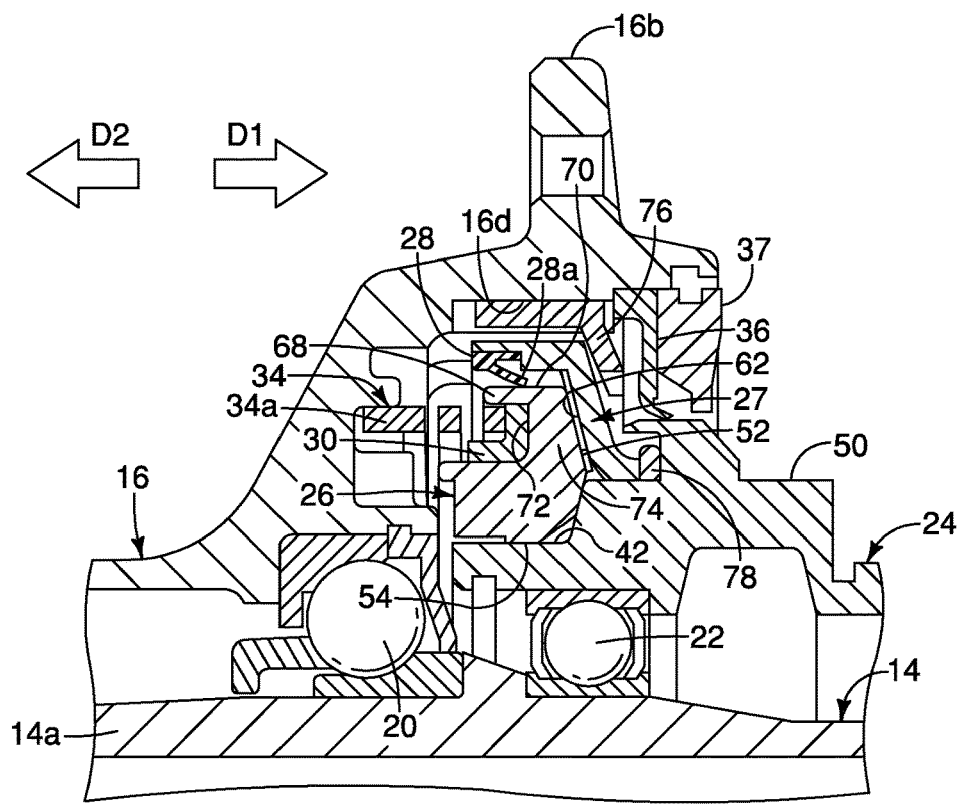
FIG. 6 is an enlarged half cross sectional view of a portion of the bicycle hub illustrated in FIG. 4 showing the first and second ratchet members in an engaged position for driving a hub shell of the bicycle hub.

Coasting or freewheeling occurs when the sprocket support body 24 is stopped from rotating in a driving rotational direction (i.e., clockwise about the rotational axis A as viewed from the freewheel side of the bicycle hub 10) by a chain, while the hub shell 16 rotates in a driving rotational direction. Additionally, coasting or freewheeling occurs when the hub shell 16 rotates faster in the driving rotational direction than the sprocket support body 24 rotates in the driving rotational direction by the chain. The first and second ratchet members 26 and 27 move relative to each other in first and second axial directions D1 and D2 as shown in FIGS. 5 and 6. In particular, the first ratchet member 26 is biased in the first axial direction D1 towards the second ratchet member 27 into an engaged position as seen in FIG. 6. During coasting, the first ratchet member 26 is moved in the second axial direction D2 away from the second ratchet member 27 towards the center of the hub shell 16 when the sprocket support body 24 stops rotating in the driving rotational direction and the hub shell 16 continues to rotate in the driving rotational direction. As a result, the first and second ratchet members 26 and 27 become disengaged such that they become separated by a gap, as seen in FIG. 5.

The bicycle hub further comprises a friction member 28. The bicycle hub further comprises an additional friction member 30. In the illustrated embodiment, the friction member 28 is provided radially between the first and second ratchet members 26 and 27 with respect to the rotational axis A, as will be further discussed. Given this arrangement, during coasting such as the sprocket support body 24 stops rotating in the driving rotational direction and the hub shell 16 continues to rotate in the driving rotational direction, the first and the second ratchet members 26 and 27 disengage due to a frictional torque between the friction member 28 and the first ratchet member 26. In this way, a freewheeling sound caused by ratcheting between the first and second ratchet members 26 and 27 during freewheeling is eliminated or reduced. In other words, in the illustrated embodiment, the functions of the friction member 28 and the additional friction member 30 are to provide frictional torque to maintain the first ratchet member 26 in a disengaged position with respect to the second ratchet member 27 during coasting. The additional friction member 30 can be omitted by making the frictional torque.

As best seen in FIGS. 7 to 10, the bicycle hub 10 further comprises a biasing member 34. As shown, the biasing member 34 is disposed between the hub shell 16 and the first ratchet member 26. The biasing member 34 biases the first ratchet member 26 in the axial direction D1 toward the second ratchet member 27 into the engagement position. Preferably, the biasing member 34 is configured to rotate with the hub shell 16. The biasing member 34 includes, for example, a compression spring in the illustrated embodiment and the additional friction member 30. In other words, in the illustrated embodiment, the additional friction member 30 is provided as a separate piece that is fixed on the end of the compression spring of the biasing member 34 that faces the first ratchet member 26. Alternatively, the additional friction member 30 can be omitted such that an end coil of the biasing member 34 forms the additional friction member.

Figure 7:
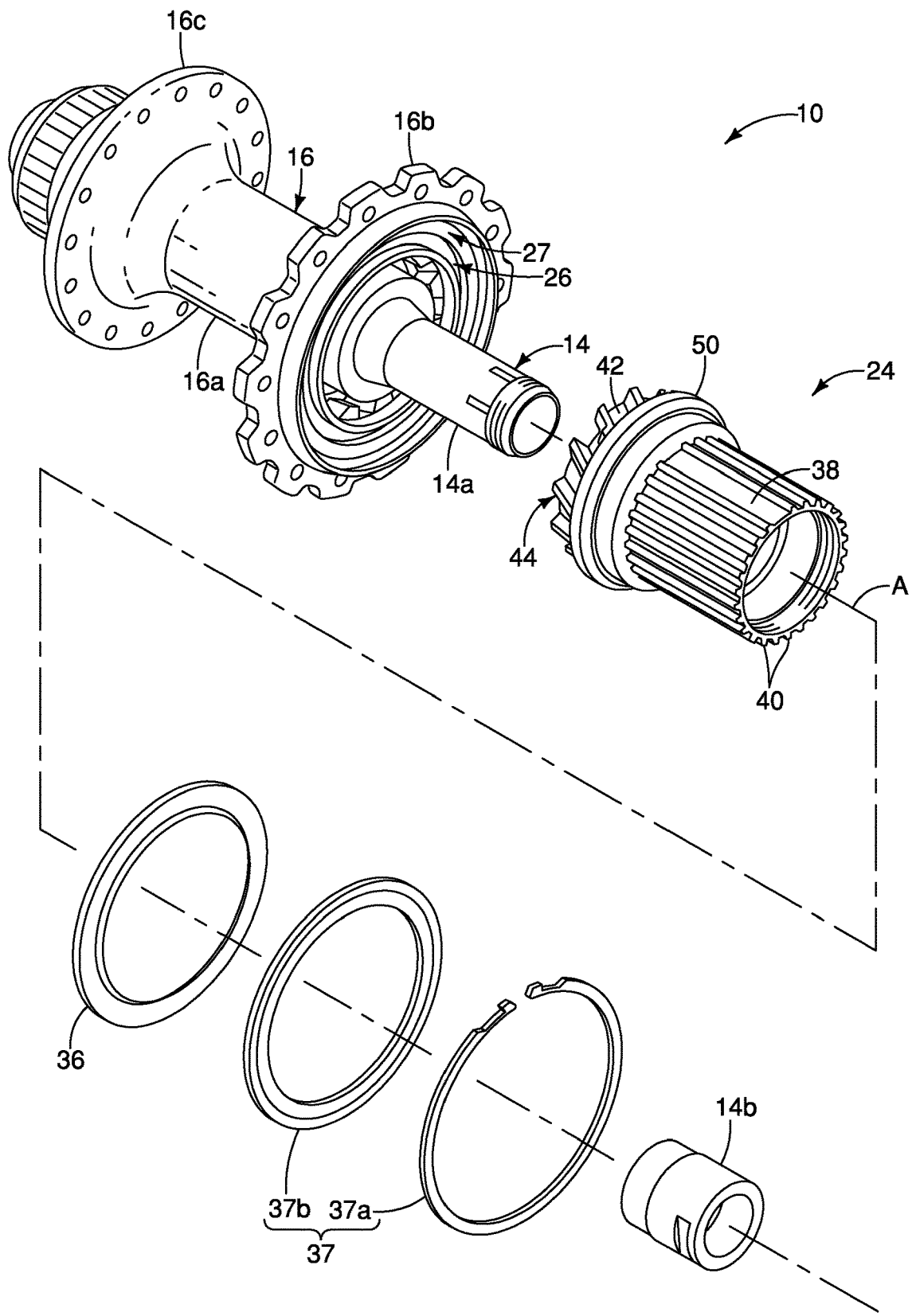
FIG. 7 is an exploded perspective view of selected parts of an end portion of the rear bicycle hub illustrated in FIGS. 1 to 6.
Figure 8:
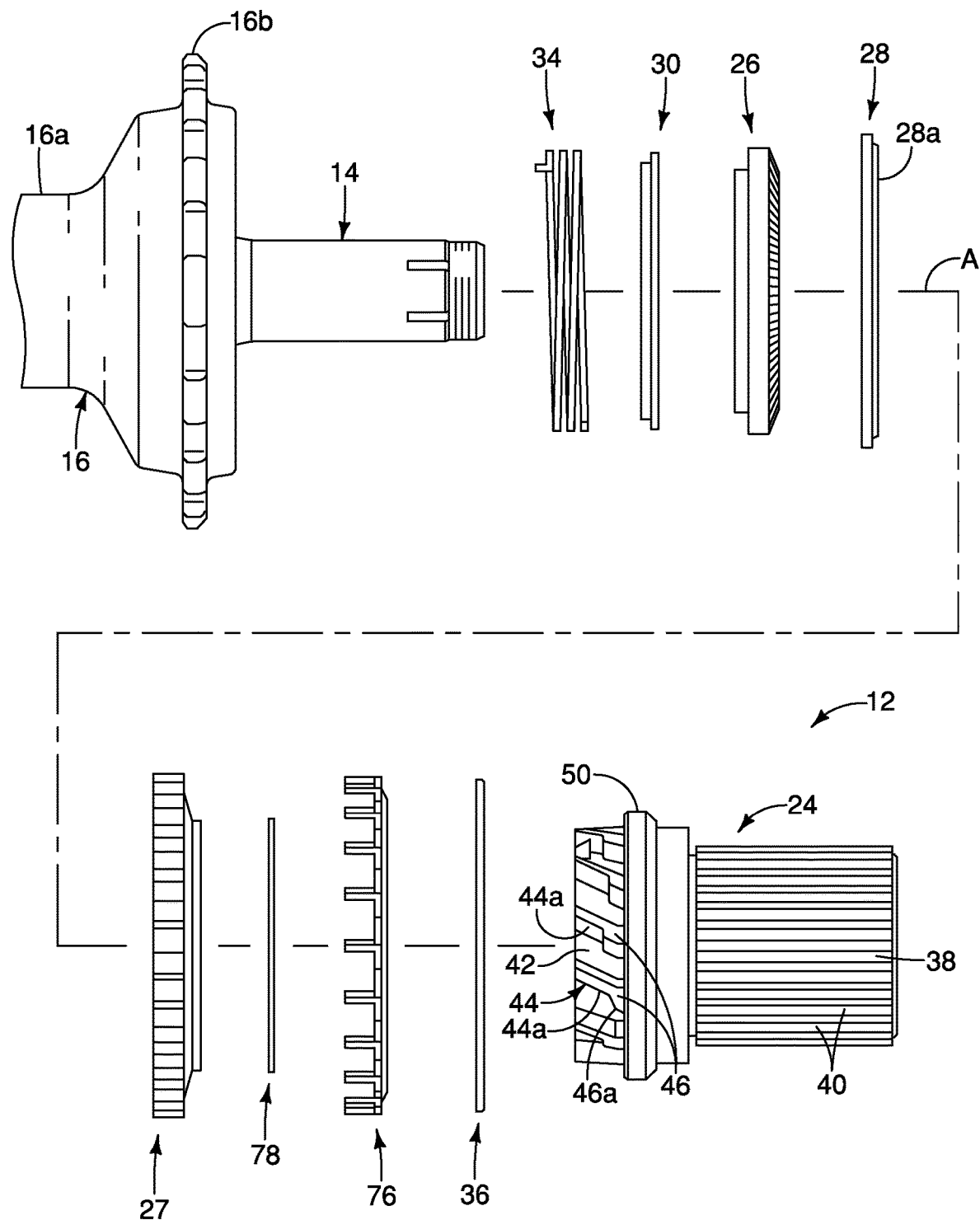
FIG. 8 is another exploded elevational view of selected parts of an end portion of the rear bicycle hub illustrated in FIGS. 1 to 6.
Figure 10:
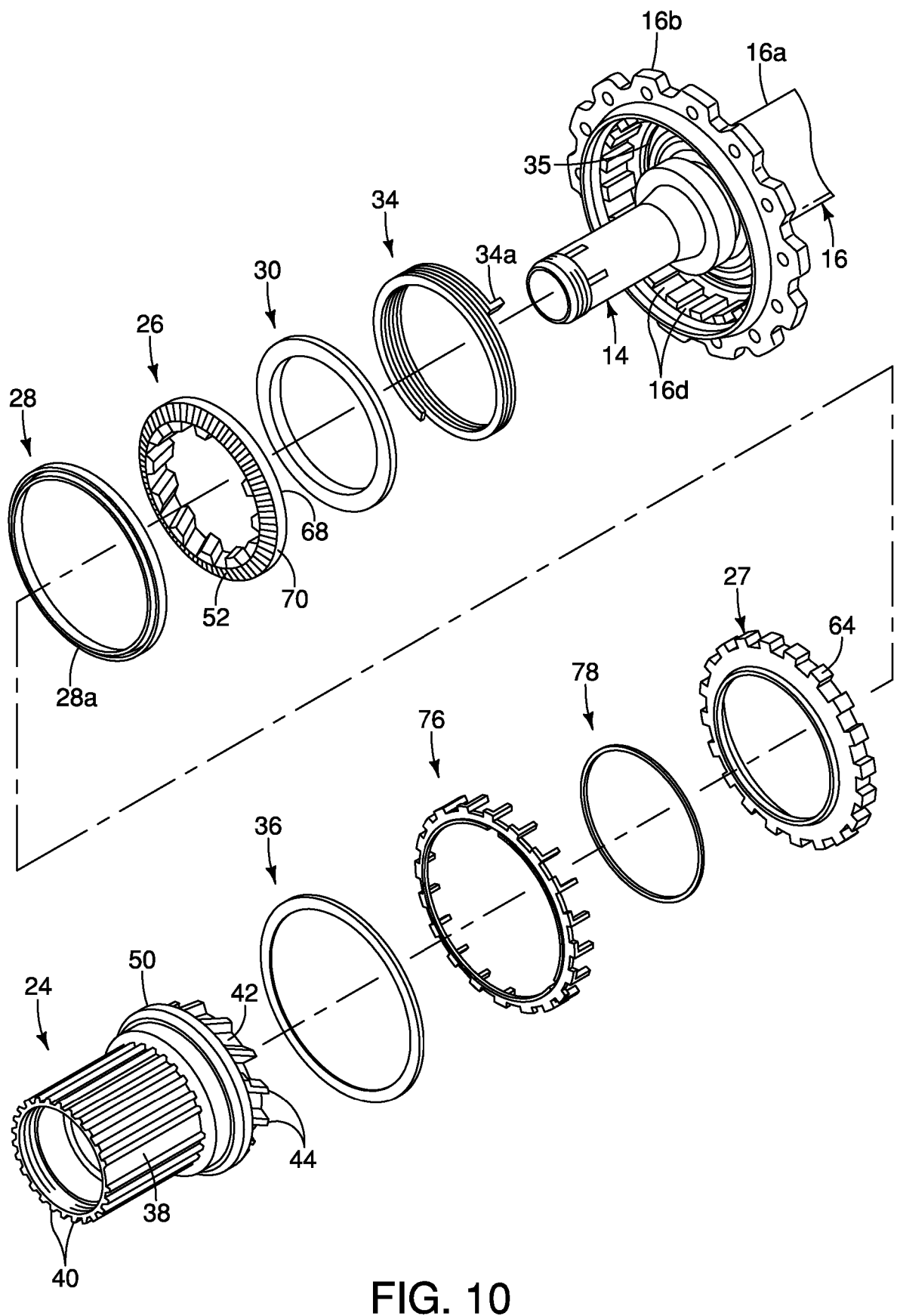
FIG. 10 is another exploded elevational view of selected parts of an end portion of the rear bicycle hub illustrated in FIGS. 1 to 6.

Preferably, as best seen in FIG. 10, the hub shell 16 includes an internal space 35. Each of the ratchet support body 30, the biasing member 34 and the first and second ratchet members 26 and 27 are at least partially disposed in the internal space 35 of the hub shell 16. A dust shield 36 is provided for covering the internal space 35 between the sprocket support body 24 and the hub shell 16. The dust shield 36 also covers an annular gap between the sprocket support body 24 and the hub shell 16. As seen in FIG. 7, a support retaining assembly 37 retains the dust shield 36 to the hub shell 16. The support retaining assembly 37 includes a retaining ring or clip 37a that engages a recess in the hub shell 16, and the support retaining assembly 37 limits outward axial movement of the dust shield 36.

The sprocket support body 24 constitutes a driving member that has a tubular shape. The sprocket support body 24 is rotatably mounted on the hub axle 14 to rotate around the rotational axis A. The sprocket support body 24 has an outer peripheral surface 38. The outer peripheral surface 38 is provided with a plurality of axially extending splines 40 for non-rotatably engaging the bicycle sprockets S in a conventional manner. The splines 40 are parallel to each other, and extend parallel to the rotational axis A. As seen in FIG. 2, the bicycle sprockets S are held on the sprocket support body 24 by a conventional nut (not shown) that screws into the sprocket support body 24. The sprocket support body 24 has another outer peripheral surface 42 having a first helical spline 44 that is helically arranged with respect to the rotational axis A. The first helical spline 44 has a first surface 44a that extends helically with respect to the rotational axis A. In the illustrated embodiment as shown, the sprocket support body 24 includes a plurality of the first helical splines 44 on the outer peripheral surface 42. Each of the first helical splines 44 includes one of the first surfaces 44a.

The outer peripheral surface 42 of the sprocket support body 24 also has a guiding portion 46 that is to move relatively the first ratchet member 26 and the second ratchet member 27 from each other in the axial direction (D1 or D2) of the rotational axis A while coasting. Here, each of the first helical splines 44 includes the guiding portion 46. In particular, the guiding portions 46 are configured to guide the first ratchet member 26 (in the second axial direction D2) toward the hub shell 16 when coasting/freewheeling occurs. As shown, the guiding portions 46 extend in at least a circumferential direction with respect to the sprocket support body 24. While each of the first helical splines 44 includes one of the guiding portions 46, it will be apparent from this disclose that sprocket support body 24 can have only one of the guiding portions 46 if needed and/or desired.

Each of the guiding portions 46 has a second surface 46a that extends helically with respect to the rotational axis A, but at a shallower angle than the first surface 44a. Thus, the second surface 46a is arranged to define an obtuse angle with the first surface 44a of the first helical spline 44. The guiding portions 46 are illustrated as being integral with the first helical splines 44 such that the second surfaces 46a are contiguous with the first surfaces 44a, respectively. However, the guiding portions 46 does not need to be part of the first helical splines 44. In other words, the guiding portions 46 can be spaced from the first helical splines 44 so that a small gap is provided between the first and second surfaces 44a and 46a such that the second surfaces 46a are not part of the first helical splines 44.

The outer peripheral surface 42 of the sprocket support body 24 supports the first and second ratchet members 26 and 27. The sprocket support body 24 includes an abutment 50 that abuts the second ratchet member 27 to restrict axial movement of the second ratchet member 27 away from the hub shell 16. The first ratchet member 26 is disposed on an axial side of the second ratchet member 27 that is opposite to the abutment 50 of the sprocket support body 24.

Figure 9:
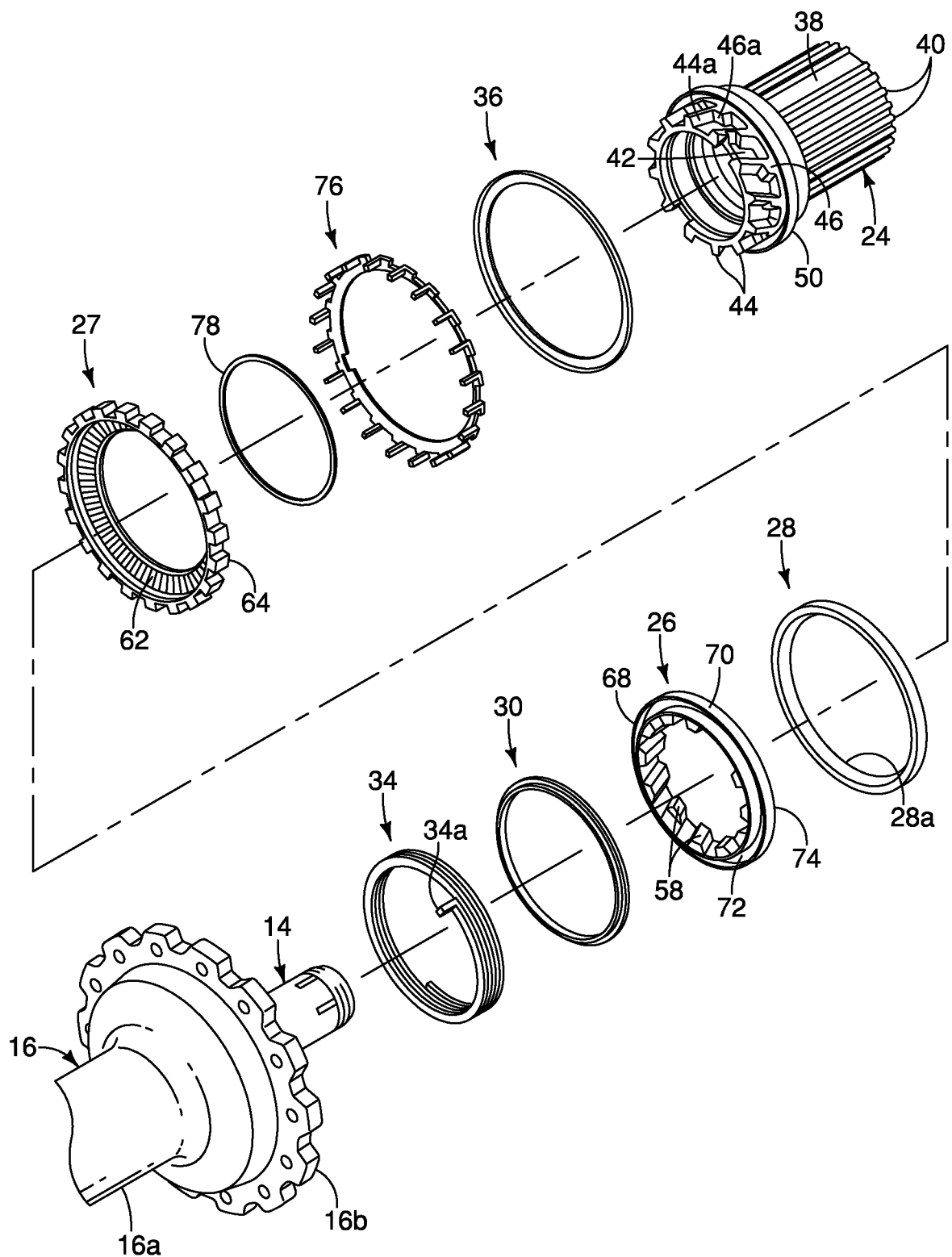
FIG. 9 is an exploded perspective view of selected parts of an end portion of the rear bicycle hub illustrated in FIGS. 1 to 6.

Referring primarily to FIGS. 9 and 10, the first ratchet member 26 is an annular member that is concentrically disposed around the hub axle 14. The first ratchet member 26 has at least one first ratchet tooth 52 and a second helical spline 54. The at least one first ratchet tooth 52 is disposed on an axial facing surface of the first ratchet member 26. Preferably, as in the illustrated embodiment, the at least one first ratchet tooth 52 includes a plurality of first ratchet teeth 52. The second helical spline 54 mates with the first helical spline 44 of the sprocket support body 24. Preferably, as in the illustrated embodiment, the first ratchet member 26 includes a plurality of second helical splines 58 in mating engagement with the first helical splines 44 of the sprocket support body 24. The first ratchet member is configured to rotate with the sprocket support body 24. In particular, the first ratchet member 26 is movably mounted in the axial direction D1 with respect to the sprocket support body 24 via the second helical spline 54 engaging the first helical spline 44 while driving by a first thrust force is applied from the sprocket support body 24 in a clockwise direction about the rotational axis A as viewed along from the freewheel side of the bicycle hub 10.

The second ratchet member 27 will now be discussed. The second ratchet member 27 is an annular member that is concentrically disposed around the hub axle 14. The second ratchet member 27 is a ring-shaped member that is concentrically disposed around the hub axle 14 and configured to rotate with the hub shell 16. The second ratchet member 27 is sandwiched between the abutment 50 of the sprocket support body 24 and the first ratchet member 26. The second ratchet member 27 is also arranged to float in the radial direction when a thrust force from the sprocket support body 24 is not transmitted to the hub shell 16. The second ratchet member 27 is also arranged to float in the axial direction to prevent an imperfect mesh with the sprocket support body 24 and the first ratchet member 26.

The second ratchet member 27 has at least one second ratchet tooth 62 that mates with the at least one first ratchet tooth 52. The at least one second ratchet tooth 62 is disposed on an axial facing surface of the second ratchet member 27 that faces the axial facing surface of the first ratchet member 26. The at least one second ratchet tooth 62 mates with the at least one first ratchet tooth 52 to transfer torque from the sprocket support body 24 to the hub shell 16. Preferably, as in the illustrated embodiment, the at least one second ratchet tooth 62 includes a plurality of second ratchet teeth 62 that mates with the first ratchet teeth 52. As seen in FIG. 9, the first ratchet teeth 52 and the second ratchet teeth 62 are dimensioned so that circumferential play P is provided therebetween. In this way, the first ratchet member 26 can rotate relative to the hub shell 16 and the second ratchet member 27 so that the first ratchet member 26 can move axially between an engagement position and a disengagement position. In the engagement position, the second ratchet teeth 62 mates with the first ratchet teeth 52. In the disengagement position, the second ratchet teeth 62 do not contact the first ratchet teeth 52.

The second ratchet member 27 also has a hub shell engagement portion 64 that engages the hub shell 16. The second ratchet member 27 transfers torque to the hub shell 16 applied from the first ratchet member 26 via the hub shell engagement portion 64. Preferably, as in the illustrated embodiment, one of the hub shell engagement portion 64 and the hub shell 16 includes at least one protrusion extending radially and the other of the hub shell engagement portion 64 and the hub shell 16 includes at least one recess that is engaged with the at least one protrusion. In the illustrated embodiment, the hub shell engagement portion 64 is defined by a plurality of protrusions and the hub shell 16 includes a plurality of recesses 16d shown in FIG. 10. In this way, the second ratchet member 27 rotates with the hub shell 16, but can also slide axially with respect to the hub shell 16 along the rotational axis A. The first ratchet member 26 is sandwiched between the abutment 50 of the hub shell 16 and the second ratchet member 27.

Referring now to FIGS. 5 to 10, the friction member 28 and the additional friction member 30 will now be discussed. In the illustrated embodiment, the friction member 28 has an annular shape (ring shaped member). The friction member 28 includes at least a non-metallic material. In particular, the friction member 28 includes at least a resin material. For example, preferably, the resin material of the friction member 28 has some elastic, deformable and resilient properties. For example, the friction member 28 can be made of an elastomeric or thermoplastic material capable of withstanding a radial load. The friction member 28 of the illustrated embodiment includes an annular cantilever lip portion 28a. The cantilever lip portion 28a is deflected radially outward when installed to ensure good contact between the friction member 28 and the first ratchet member 26.

As best seen in FIGS. 5 and 6, the friction member 28 contacts a contacted member 68. Here, the friction member 28 contacts a friction surface 70 that is provided on the contacted member 68. In particular, the cantilever lip portion 28a of the friction member 28 contacts the friction surface 70 to provide a frictional torque to the first ratchet member 26 during coasting so that the first ratchet teeth 52 move out of contact with the second ratchet teeth 62. More particularly, due to the frictional torque provided by the friction member 28, the first ratchet member 26 rotates slightly in a circumferential direction to a disengaged position. In other words, due to this frictional torque provided by the friction member 28, the friction member 28 rotates the first ratchet member 26 slightly in a circumferential direction with respect to the sprocket support body 24 as the hub shell 16 continuous to rotate while coasting. The slight circumferential movement of the first ratchet member 26 with respect to the sprocket support body 24 is provided for by the first ratchet member 26 sliding along the second surfaces 46a of the guiding portions 46.

In the illustrated embodiment as shown in FIGS. 5 and 6, the contacted member 68 is integrally formed with the first ratchet member 26. The friction member 28 contacts the first ratchet member 26 in a radial direction of the rotational axis A. The friction member 28 is configured to rotate with one of the hub shell 16 and the first ratchet member 26. The friction member 28 contacts in a radial direction of the rotational axis A the contacted member 68 that is configured to rotate with the other of the hub shell 16 and the first ratchet member 26. In particular, in the illustrated embodiment, the friction member 28 of the illustrated embodiment is configured to rotate with the hub shell 16. In particular, in the illustrated embodiment, the friction member 28 of the illustrated embodiment is fixedly attached to the second ratchet member 27. On the other hand, the contacted member 68 rotates with the first ratchet member 26. It will be apparent to those skilled in the bicycle field from this disclosure that the bicycle hub 10 can be configured such that the friction member 28 rotates with the first ratchet member 26 and the contacted member 68 rotates with the hub shell 16, as needed and/or desired. Alternatively, the contacted member 68 can be a separate member from the first ratchet member 26. For example, the contacted member 68 can be integrally formed or fixedly attached to the hub shell 16 such that the friction member 28 contacts the hub shell 16.

The additional friction member 30 also has an annular shape. The additional friction member 30 can be made of either a non-metallic material or metallic material. For example, the additional friction member 30 can be made of a thermoplastic material. For example, the additional friction member 30 can be made of a material capable of withstanding an axial load.

The additional friction member 30 contacts an additional friction surface 72 provided on an additional contacted member 74. In particular, in the illustrated embodiment, the additional contacted member 74 is integrally formed with the first ratchet member 26. The additional friction member 30 contacts the first ratchet member 26 at the additional friction surface 72. The additional friction surface 72 is different from the friction surface 70. In particular, the friction surface 70 and the additional friction surface 72 face different directions on the first ratchet member 26. As shown, the friction surface 70 faces the radial direction with respect to the rotational axis A, while the additional friction surface 72 faces the axial direction with respect to the rotational axis A. The additional friction member 30 is configured to rotate with one of the hub shell 16 and the first ratchet member 26 while the additional contacted member 74 is configured to rotate with the other of the hub shell 16 and the first ratchet member 26. In the illustrated embodiment, the additional friction member 30 rotates with the hub shell 16 and the additional contacted member 74 rotates with the first ratchet member 26. However, it will be apparent to those skilled in the bicycle field from this disclosure that the bicycle hub 10 can be arranged such that the additional friction member 30 rotates with the first ratchet member 26 while the additional contacted member 74 rotates with the hub shell 16, as needed and/or desired.

The bicycle hub 12 further includes a circumferential spacer 76 and an axial spacer 78. The spacer 76 is disposed between the hub shell 16 and the second ratchet member 27 to take up the circumferential space between the hub shell engagement portion 64 of the second ratchet member 27 and the recesses 16d of the hub shell 16. The spacer 78 is disposed between the hub shell 16 and the sprocket support body 24.

In the illustrated embodiment, the biasing member 34 has a protrusion 34a that is disposed in a recess of the hub shell 16 so that the biasing member 34 rotates together with the hub shell 16. With the sprocket support body 24 in a rest position (i.e., no torque being applied thereto), the biasing member 34 maintains the first ratchet teeth 52 of the first ratchet member 26 in driving engagement with the second ratchet teeth 62 of the second ratchet member 27. Specifically, the additional friction member 30 is pushed axially against the additional friction surface 72 of the additional contacted member 74, which is part of the first ratchet member 26. When a coasting torque is applied to the sprocket support body 24, the first ratchet member 26 rotates slightly in a circumferential direction and slides along the second surfaces 46a of the guiding portions 46 due to the frictional torque between the additional friction member 30 and the first ratchet member 26 so that the first ratchet teeth 52 move out of contact with the second ratchet teeth 62.

During coasting, the first ratchet member 26 constantly receives a force in the axial direction D2 toward the hub shell 16 due to the frictional torque between the additional friction member 30 and the first ratchet member 26 to separate the first ratchet teeth 52 from the second ratchet teeth 62. As a result, during coasting, the hub shell 16, the biasing member 34, the second ratchet teeth 62 of the second ratchet member 27 rotate together relative to the first ratchet member 26 with sliding contact occurring between the first ratchet member 26 and the additional friction member 30.

In particular, each of the guiding portions 46 is configured so as to release a meshing engagement between the at least one first ratchet tooth 52 and the at least one second ratchet tooth 62 while coasting. The first ratchet member 26 contacts the guiding portions 46 and disengages from the second ratchet member 27 by a second thrust force caused by frictional torque between the biasing member 34 and the first ratchet member 26 while coasting. The first helical splines 54 of the first ratchet member 26 abut the second surfaces 46a of the guiding portions 46 of the sprocket support body 24 by the sliding torque. Then a coasting thrust force arises so that the first ratchet member 26 moves in the axial direction D2 toward the hub shell 16 against the force of the biasing member 34. As a result, the first ratchet teeth 52 of the first ratchet member 26 do not contact the second ratchet teeth 62 of the second ratchet member 27 during coasting.

However, during driving when the sprocket support body 24 is rotated in the driving direction, the second helical spline 54 of the first ratchet member 26 slides axially along the first surfaces 44a of the first helical splines 44 on the outer peripheral surface 42 of the sprocket support body 24 in the axial direction D1 of the bicycle hub 10. The first ratchet member 26 is biased towards the second ratchet member 27 by the biasing member 34 in the axial direction D1 of the bicycle hub 10. When the driving torque is applied to the sprocket support body 24, the first ratchet teeth 52 of the first ratchet member 26 and the second ratchet teeth 62 of the second ratchet member 27 are meshed so that the hub shell 16 rotates with the sprocket support body 24. Thus, as the driving torque rises, the mesh engagement between the first ratchet member 26 and the second ratchet member 27 becomes stronger.

Figure 11:
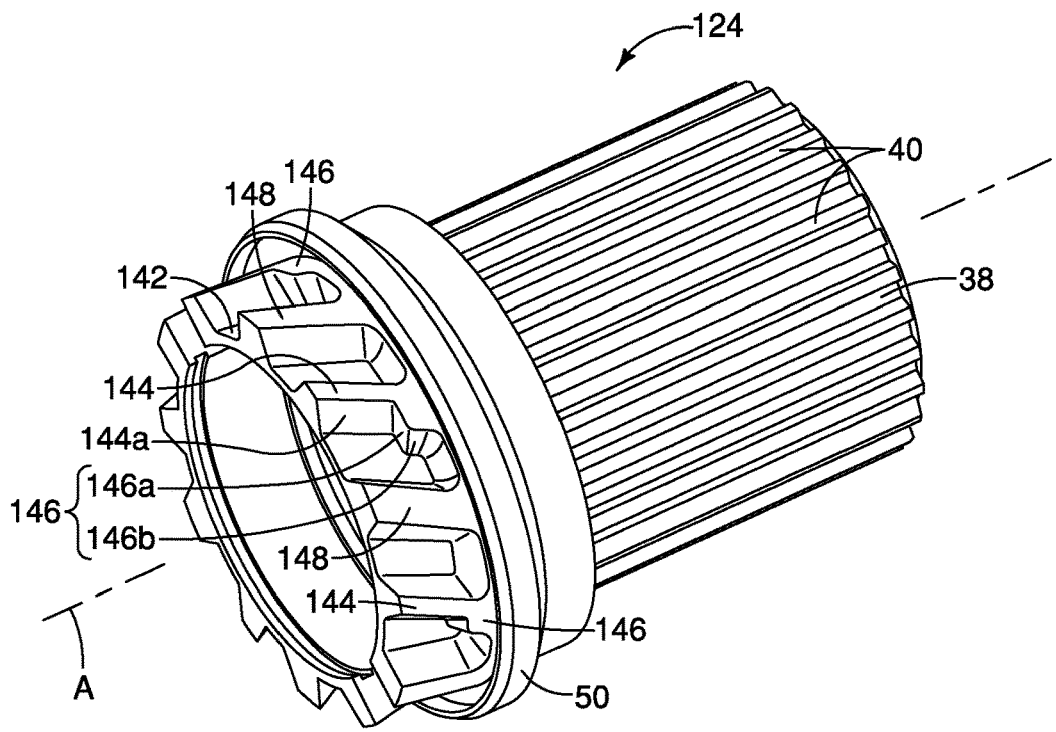
FIG. 11 is a perspective view of a modified sprocket support body that can be utilized with the bicycle hub illustrated in FIGS. 1 to 6.
Figure 12:
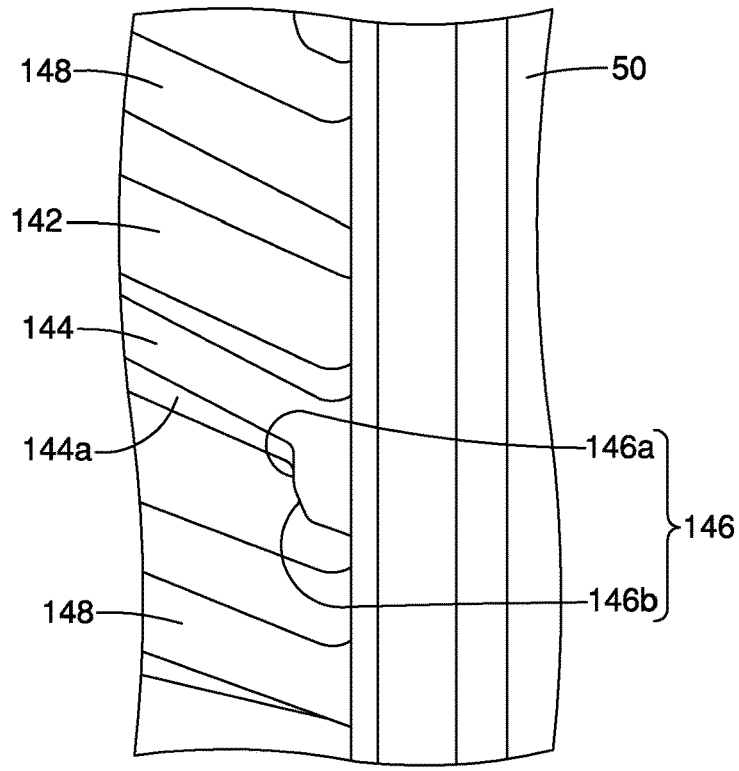
FIG. 12 is an enlarged view of a portion of the modified sprocket support body illustrated in FIG. 11.

Referring now to FIGS. 11 and 12, a modified sprocket support body 124 that can be utilized with the bicycle hub 10 will now be discussed. In other words, the bicycle hub 10 can be modified to include the modified sprocket support body 124 instead of the sprocket support body 24. Due to the similarity between the modified sprocket support body 124 and the sprocket support body 24, corresponding structures between the modified sprocket support body 124 and the sprocket support body 24 that are identical will receive the same reference numerals. Corresponding structures that have been modified will receive the same reference numerals but increased by 100.

Similar to the sprocket support body 24, the sprocket support body 124 includes the outer peripheral surface 38 with the axially extending splines 40 and the abutment 50 that abuts the second ratchet member 27 to restrict axial movement of the second ratchet member 27 away from the hub shell 16. The sprocket support body 124 has another outer peripheral surface 142 having a plurality of modified first helical splines 144 with modified guiding portions 146 and a plurality of additional helical splines 148. The modified first helical spline 144 and the additional helical splines 148 are alternately arranged with respect to each other, and are helically arranged with respect to the rotational axis A. The modified sprocket support body 124 is identical to the sprocket support body 24, except for the modified guiding portion 146, the modified guiding portions 146 and the additional helical splines 148. While each of the modified first helical splines 144 includes one of the modified guiding portions 146, it will be apparent from this disclose that modified sprocket support body 124 can have only one of the modified guiding portions 146 if needed and/or desired.

In particular, each of the modified guiding portion 146 includes a flat surface 146a and a slanted surface 146b. The flat surface 146a extends perpendicularly to the first surface 144a of the sprocket support body 124. Also, as shown, the flat surface 146a is formed perpendicular to the axial direction of the rotational axis A. The slanted surface 146b extends from the flat surface 146a such that the slanted surface 146b is slanted with respect to the flat surface 146a. As a result, the slanted surface 146b is slanted with respect to the axial direction of the rotational axis A. The flat surface 146a form an obtuse angle with respect to a first surface 144a of the helical spline 144 similar to the first embodiment. The flat surface 146a and the slanted surface 146b help to minimize the ratcheting sound during coasting. The flat surface 146a keeps the first ratchet member 26 and the second ratchet member 27 away from each other in the axial direction of the rotational axis A while coasting. In other words, the flat surface 146a helps to keep the minimization of the ratcheting sound during coasting.

In the illustrated embodiment, the guiding portion 146 is not provided on other the additional helical splines 148. However, it will be apparent to those skilled in the bicycle field from this disclosure that the additional helical spline 148 can have a guiding portion 146, as needed and/or desired.

In understanding the scope of the present invention, the foregoing also applies to words having similar meanings such as the terms, "including", "having" and their derivatives. Also, the terms "part," "section," "portion," or "member" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle hub. Accordingly, these directional terms, as utilized to describe the bicycle hub should be interpreted relative to a bicycle in an upright riding position on a horizontal surface and that is equipped with the bicycle hub. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time.

Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hub comprising:
a hub axle defining a rotational axis;
a hub shell rotatably mounted on the hub axle to rotate around the rotational axis;
a sprocket support body rotatably mounted on the hub axle to rotate around the rotational axis, the sprocket support body having an outer peripheral surface;
a first ratchet member having at least one first ratchet tooth, the first ratchet member configured to rotate with the sprocket support body;
a second ratchet member having at least one second ratchet tooth mating with the at least one first ratchet tooth, the second ratchet member being configured to rotate with the hub shell; and
a friction member configured to rotate with one of the hub shell and the first ratchet member, the friction member contacting in a radial direction of the rotational axis a contacted member that is configured to rotate with the other of the hub shell and the first ratchet member, the friction member providing frictional torque to maintain the first ratchet member in a disengaged position with respect to the second ratchet member during coasting of a bicycle equipped with the bicycle hub, the friction member being an annular shape,
the outer peripheral surface of the sprocket support body having a guiding portion configured to move relatively the first ratchet member and the second ratchet member from each other in an axial direction of the rotational axis while coasting.

2. The bicycle hub according to claim 1, wherein the guiding portion extends in at least a circumferential direction with respect to the sprocket support body.

3. The bicycle huh according to claim 2, wherein the guide portion includes a flat surface formed perpendicular to an axial direction of the rotational axis.

4. The bicycle hub according to claim 3, wherein the guide portion includes a slanted surface with respect to the axial direction of the rotational axis.

5. The bicycle hub according to claim 1, wherein the guiding portion guides the first ratchet member toward the hub shell while coasting.

6. The bicycle hub according to claim 1, wherein the at least one first ratchet tooth is disposed on an axial facing surface of the first ratchet member, and
the at least one second ratchet tooth is disposed on an axial facing surface of the second ratchet member that faces the axial facing surface of the first ratchet member.

7. The bicycle hub according to claim 1, wherein the outer peripheral surface of the sprocket support body has a first helical spline, and
the first ratchet member has a second helical spline mating with the first helical spline, the first ratchet member is movably mounted in an axial direction with respect to the sprocket support body via the second helical spline in engagement with the first helical spline while driving by a thrust force that is applied from the sprocket support body.

8. The bicycle hub according to claim 7, wherein
the sprocket support body includes a plurality of the first helical spline on the outer peripheral surface, and
the first ratchet member includes a plurality of the second helical splines in mating engagement with the first helical splines of the sprocket support body.

9. The bicycle hub according to claim 1, wherein the first and second ratchet members are annular members.

10. The bicycle hub according to claim 1, wherein
the second ratchet member has a hub shell engagement portion that engages the hub shell, and
one of the hub shell engagement portion and the hub shell includes at least one protrusion extending radially and the other of the hub shell engagement portion and the hub shell includes at least one recess that is engaged with the at least one protrusion.

11. The bicycle hub according to claim 1, further comprising
a biasing member disposed between the hub shell and the first ratchet member, the biasing member biasing the first ratchet member in the axial direction toward the second ratchet member.

12. The bicycle hub according to claim 11, wherein
the biasing member is configured to rotate with the hub shell, and
the first ratchet member contacts the guiding portion and disengages from the second ratchet member by a thrust force caused by frictional torque between the biasing member and the first ratchet member while coasting.

13. The bicycle hub according to claim 1, further comprising
at least one bearing assembly rotatably supporting the sprocket support body on the hub axle.

14. The bicycle hub according to claim 1, further comprising
at least one bearing assembly rotatable supporting the hub shell on the hub axle.

15. The bicycle hub according to claim 1, wherein
the at least one first ratchet tooth includes a plurality of first ratchet teeth, and
the at least one second ratchet tooth includes a plurality of second ratchet teeth.

16. The bicycle hub according to claim 1, wherein
the sprocket support body includes an abutment that abuts the second ratchet member to restrict axial movement of the second ratchet member away from the hub shell, and
the first ratchet member is disposed on an axial side of the second ratchet member that is opposite to the abutment of the sprocket support body.

17. The bicycle hub according to claim 1, wherein
the hub shell includes an internal space,
the outer peripheral surface of the sprocket support body supports the first and second ratchet members, and
the first and second ratchet members are at least partially disposed in the internal space of the hub shell.

18. The bicycle hub according to claim 1, wherein
the friction member including at least a resin material that contacts the first ratchet member in the radial direction of the rotational axis.

19. A bicycle hub comprising:
a hub axle defining a rotational axis;

a hub shell rotatably mounted on the hub axle to rotate around the rotational axis;

a sprocket support body rotatably mounted on the hub axle to rotate around the rotational axis, the sprocket support body having an outer peripheral surface;

a first ratchet member having at least one first ratchet tooth; the first ratchet member configured to rotate with the sprocket support body;

a second ratchet member having at least one second ratchet tooth mating with the at least one first ratchet tooth, the second ratchet member being configured to rotate with the hub shell; and a friction member configured to rotate with one of the hub shell and the first ratchet member, the friction member contacting in a radial direction of the rotational axis a contacted member that is configured to rotate with the other of the hub shell and the first ratchet member, the friction member providing frictional torque to maintain the first ratchet member in a disengaged position with respect to the second ratchet member during coasting of a bicycle equipped with the bicycle hub, the friction member including at least a non-metallic material, the outer peripheral surface of the sprocket support body having a guiding portion configured to move relatively the first ratchet member and the second ratchet member from each other in an axial direction of the rotational axis while coasting.

20. A bicycle hub comprising:

a hub axle defining a rotational axis;

a hub shell rotatably mounted on the hub axle to rotate around the rotational axis;

a sprocket support body rotatably mounted on the hub axle to rotate around the rotational axis, the sprocket support body having an outer peripheral surface;

a first ratchet member having at least one first ratchet tooth, the first ratchet member configured to rotate with the sprocket support body;

a second ratchet member having at least one second ratchet tooth mating with the at least one first ratchet tooth, the second ratchet member being configured to rotate with the hub shell; and a friction member configured to rotate with one of the hub shell and the first ratchet member, the fiction member contacting in a radial direction of the rotational axis a contacted member that is configured to rotate with the other of the hub shell and the first ratchet member, the friction member providing frictional torque to maintain the first ratchet member in a disengaged position with respect to the second ratchet member during coasting of a bicycle equipped with the bicycle hub, and a biasing member disposed between the hub shell and the first ratchet member, the biasing member biasing the first ratchet member in an axial direction of the rotational axis, the outer peripheral surface of the sprocket support body having a guiding portion configured to move relatively the first ratchet member and the second ratchet member from each other in an axial direction of the rotational axis while coasting.

21. A bicycle hub comprising:

a hub axle defining a rotational axis;

a hub shell rotatably mounted on the hub axle to rotate around the rotational axis;

a sprocket support body rotatably mounted on the hub axle to rotate around the rotational axis, the sprocket support body having an outer peripheral surface;

a first ratchet member having at least one first ratchet tooth, the first ratchet member configured to rotate with the sprocket support body;

a second ratchet member having at least one second ratchet tooth mating with the at least one first ratchet tooth, the second ratchet member being configured to rotate with the hub shell; and a friction member configured to rotate with the huh shell, the friction member contacting the first ratchet member in a radial direction of the rotational axis, the friction member providing frictional torque to maintain the first ratchet member in a disengaged position with respect to the second ratchet member during coasting of a bicycle equipped with the bicycle hub, the outer peripheral surface of the sprocket support body having a guiding portion configured to move relatively the first ratchet member and the second ratchet member from each other in an axial direction of the rotational axis while coasting.

22. A bicycle hub comprising:

a hub axle defining a rotational axis;

a hub shell rotatably mounted on the hub axle to rotate around the rotational axis;

a sprocket support body rotatably mounted on the hub axle to rotate around the rotational axis, the sprocket support body having an outer peripheral surface;

a first ratchet member having at least one first ratchet tooth, the first ratchet member configured to rotate with the sprocket support body;

a second ratchet member having at least one second ratchet tooth mating with the at least one first ratchet tooth, the second ratchet member being configured to rotate with the hub shell;

a friction member configured to rotate with one of the hub shell and the first ratchet member, the friction member contacting a friction surface provided on a contacted member, the contacted member being configured to rotate with the other of the hub shell and the first ratchet member, the friction member providing frictional torque to maintain the first ratchet member in a disengaged position with respect to the second ratchet member during coasting of a bicycle equipped with the bicycle hub; and an additional friction member configured to rotate with one of the hub shell and the first ratchet member, the additional friction member contacting an additional friction surface provided on an additional contacted member, the additional contacted member being configured to rotate with the other of the hub shell and the first ratchet member, the additional friction surface being different from the friction surface, the outer peripheral surface of the sprocket support body having a guiding portion configured to move relatively the first ratchet member and the second ratchet member from each other in an axial direction of the rotational axis while coasting.

* * * * *